(12) United States Patent
Yamashita

(10) Patent No.: US 8,660,488 B2
(45) Date of Patent: Feb. 25, 2014

(54) COMMUNICATION DEVICE

(75) Inventor: Makoto Yamashita, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 518 days.

(21) Appl. No.: 12/604,196

(22) Filed: Oct. 22, 2009

(65) Prior Publication Data

US 2010/0197229 A1 Aug. 5, 2010

(30) Foreign Application Priority Data

Jan. 30, 2009 (JP) ................................. 2009-020392

(51) Int. Cl.
*H04B 7/00* (2006.01)
(52) U.S. Cl.
USPC .................. 455/41.2; 455/41.3; 340/10.1
(58) Field of Classification Search
USPC .................. 455/41.1–41.3; 340/10.1–10.3, 340/10.31–10.32
See application file for complete search history.

(56) References Cited

U.S. PATENT DOCUMENTS

| 7,050,945 | B2 | 5/2006 | Oba et al. | |
| 7,773,989 | B2 * | 8/2010 | Tobe et al. | 455/435.2 |
| 7,890,646 | B2 * | 2/2011 | Khosravy et al. | 709/231 |
| 8,121,548 | B2 * | 2/2012 | Hunn et al. | 455/41.3 |
| 2002/0098878 | A1 * | 7/2002 | Mooney et al. | 455/569 |
| 2007/0073929 | A1 | 3/2007 | Takayama et al. | |
| 2008/0129457 | A1 | 6/2008 | Ritter et al. | |
| 2009/0111378 | A1 * | 4/2009 | Sheynman et al. | 455/41.1 |

FOREIGN PATENT DOCUMENTS

| JP | 2003-085659 | | 3/2003 |
| JP | 2004-364145 | | 12/2004 |
| JP | 2007-074598 | | 3/2007 |
| JP | 2008-104088 | A | 5/2008 |
| JP | 2008-153911 | | 7/2008 |
| JP | 2008-532105 | | 8/2008 |
| WO | WO 2007/072135 | * | 6/2007 |
| WO | WO 2007-072135 | A | 6/2007 |

OTHER PUBLICATIONS

Japanese Office Action for Japanese Application No. 2010-127134, mailed Jan. 17, 2012, in 6 pages.

* cited by examiner

*Primary Examiner* — Nay A Maung
*Assistant Examiner* — Angelica M Perez
(74) *Attorney, Agent, or Firm* — Knobbe, Martens, Olson & Bear LLP

(57) ABSTRACT

A communication device includes: a first communication interface configured to perform a first wireless communication with a first counterpart device; a second communication interface configured to perform a second wireless communication with a second counterpart device; an identification information acquiring module configured to acquire identification information unique to the second counterpart device from the second counterpart device by the second wireless communication performed by the second communication interface; and a transmission controller configured to perform a control so that data is sent to the second counterpart device that is identified by the identification information acquired by the identification information acquiring module by performing the first wireless communication with the second counterpart device according to the first communication method.

11 Claims, 8 Drawing Sheets

FIG. 6

<SETTING OF AUDIO OUTPUT DESTINATIONS>

| DEVICE NAME | PRIORITY RANK |
|---|---|
| SPEAKER | RANK 1 |
| HEADSET | RANK 2 |
| PORTABLE SPEAKER | RANK 3 |

FIG. 7

| BD ADDRESS | NUMBER OF TIMES OF CONNECTION TO AUDIO PLAYER 1 |
|---|---|
| ○○-△△-××-□□-◎◎-▽▽ | 10 |
| ○○-△△-▽×-○□-○◎-△▽ | 14 |
| ○○-×△-▽□-◎□-○◎-△△ | 3 |
| ○○-△□-○×-○×-□□-◎□ | 20 |
| ⋮ | ⋮ |

FIG. 8

| BD ADDRESS | ACCUMULATED TIME OF COMMUNICATIONS WITH AUDIO PLAYER 1 |
|---|---|
| ○○−△△−××−□□−◎◎−▽▽ | 1 HR 30 MIN 26 SEC |
| ○○−△△−▽×−○□−○◎−△▽ | 0 HR 45 MIN 52 SEC |
| ○○−×△−▽□−◎□−○◎−△△ | 4 HR 07 MIN 10 SEC |
| ○○−△□−○×−○×−□□−◎□ | 6 HR 12 MIN 09 SEC |
| ⋮ | ⋮ | ns # COMMUNICATION DEVICE

CROSS REFERENCE TO RELATED APPLICATION(S)

The present disclosure relates to the subject matters contained in Japanese Patent Application No. 2009-020392 filed on Jan. 30, 2009, which are incorporated herein by reference in its entirety.

FIELD

The present invention relates to a communication device having a wireless communication function.

BACKGROUND

In recent years, in short-range communication technologies such as Bluetooth (registered trademark; hereinafter abbreviated as BT), cases in which an NFC (near field communication) communication function is used in making a setting of communication between communication devices have come to be found.

For example, a communication system is disclosed in which a BD (Bluetooth device) address list of communication devices belonging to a BT communication group is acquired by an NFC communication (refer to JP-A-2008-153911, for example). This communication system includes an IC (integrated circuit) card and plural BT devices each incorporating an IC card reader. BD addresses which are identifiers of respective BT devices of a group in which BT communications should be performed are stored in the IC card in advance. When the IC card is placed over one BT device belonging to the group, the BT device reads the list of the group by an NFC communication. After acquiring the list of the BT communication group, the BT device inquires of nearby BT devices whether they can perform a BT communication by sending IQ (inquiry) packets to them. If finding a BT device whose BD address is included in the list of the group, the inquiry source BT device starts a BT communication with the thus-found BT device.

The above inquiry operation takes time to find nearby BT devices capable of BT communication. Furthermore, it also takes time and labor for the user to select a BT device to communicate with from a list of BT devices capable of BT communication that responded to the inquiry.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 6 shows an example priority order setting picture used in the second embodiment.

FIG. 7 is a conceptual diagram showing an example information management according to the second embodiment in which priority order of audio data transmission destinations is set according to the numbers of communications performed with the respective transmission destinations.

FIG. 8 is a conceptual diagram showing an example information management according to the second embodiment in which priority order of audio data transmission destinations is set according to accumulated times of communications performed with the respective transmission destinations.

DETAILED DESCRIPTION OF THE EMBODIMENTS

An example will be described below in which wireless communication (hereinafter referred to as BT communication) that complies with the Bluetooth (registered trademark) standard is employed as the first communication method of the present invention and wireless communication (hereinafter referred to as NFC communication) is employed as the second communication method of the invention. An audio player 1 which sends audio data to another communication device will be described as an example of the communication device according to the invention.

The BT employs a frequency hopping spread spectrum communication method using a 2.4-GHz band (ISM (industrial, scientific and medical) band), and enables a short-rage (about 10 m) wireless link between communication devices.

In the description, a case that audio data is transmitted according to a profile called A2DP (advanced audio distribution profile) of the BT communication which serves for transmission of high-quality audio data.

The NFC is a communication protocol of electromagnetic induction, near field communication which is performed with another communication device using a single-frequency carrier wave. The carrier wave frequency is 13.56 MHz (ISM band), for example. The term "near field communication" means communication that can be performed when the distance between communication devices concerned is less than several tens of centimeters, and includes communication in which the bodies of communication devices concerned are in contact with each other.

Figure 1:
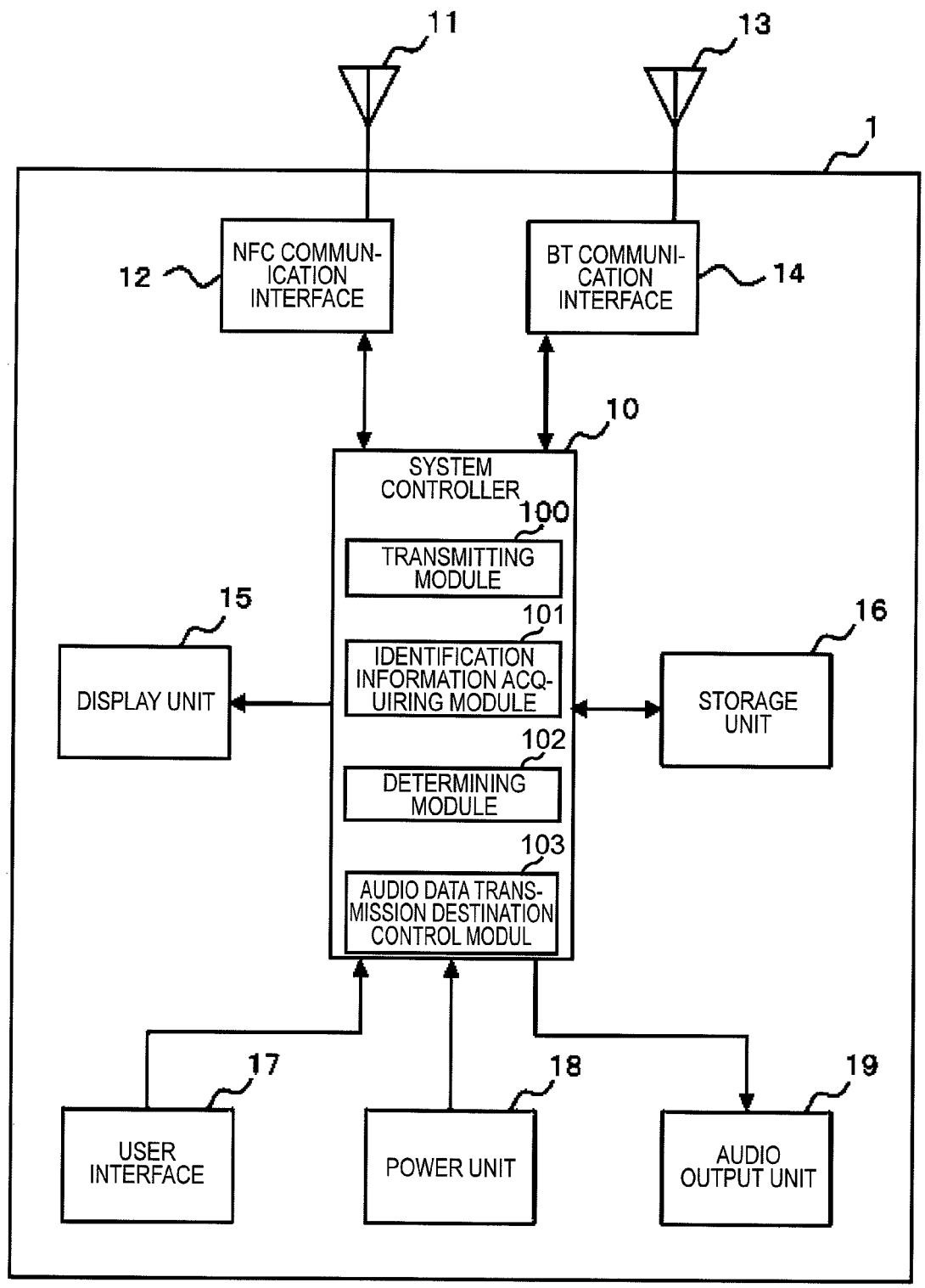
FIG. 1 is a functional block diagram of an audio player according to a first embodiment.

FIG. 1 is a functional block diagram of the audio player 1 according to a first embodiment. The audio player 1 is equipped with a system controller 10, an NFC antenna 11, an NFC communication interface 12, a BT communication antenna 13, a BT communication interface 14, a display unit 15, a storage unit 16, a user interface 17, a power unit 18, and an audio output unit 19.

The system controller 10, which is a processor for controlling the operations of the audio player 1, controls other components by running programs that are stored in the storage unit 16.

The NFC antenna 11 is an antenna for an NFC communication with an external communication device.

The NFC communication interface 12 receives data from an external communication device by performing an NFC communication with its NFC communication interface via the NFC antenna 11. The embodiment will be directed to a case that data that is received by an NFC communication is a BD (Bluetooth device) address that is unique to a communication device. That is, the BD address corresponds to the identification information that is used in the invention. In this specification, the reception of a BD address by an NFC communication will not be described in detail because it is a known technique.

The BT communication antenna 13 is an antenna for performing a BT communication with an external communication device.

The BT communication interface 14 sends data to an external communication device by performing a BT communication with its BT communication interface via the BT communication antenna 13. The embodiment will be directed to a case that data that is sent by a BT communication is audio data.

The display unit 15 displays various kinds of information to the user. For example, the various kinds of information are a music name of musical data being reproduced and a reproduction time.

The storage unit 16, which is a nonvolatile memory device, for example, is stored with programs for controlling the operations of the audio player 1. The programs include routines for causing the system controller 10 to perform a source function which is a function of the audio data transmission side of A2DP of the BT as well as the functions of the NFC communication interface 12 and the BT communication interface 14.

The source function of A2DP is a function of an audio data transmission side device of streaming reproduction and is used for transmission of an audio data stream in the form of a radio signal.

That is, streaming transmission of audio data is performed via a wireless link of A2DP which is established with an audio reception side device. In this specification, it is assumed that a transmitting module 100 performs the source function of A2DP. The transmitting module 100 is located inside the system controller 10 in FIG. 1 because it functions as programs for controlling related operations of the audio player 1 are run by the system controller 10. For example, the transmitting module 100 encodes audio data that is stored after being subjected to PCM (pulse code modulation) into data having an SBC (subband codec) format and sends the latter data to an audio reception side device by a streaming transmission via an A2DP link established by the BT communication interface 14.

The storage unit 16 also stores programs relating to control of an audio data transmission destination. As the programs relating to control of an audio data transmission destination are run by the system controller 10, an identification information acquiring module 101, a determination module 102, and an audio data transmission destination control module 103 (described later) perform their functions and control of an audio data transmission destination is performed.

The user interface 17 inputs an operation signal corresponding to an operation made by the user to the system controller 10. The operation made by the user may be either an operation made through a remote controller (not shown) or an operation made through a button or the like provided in the audio player 1. For example, the operation made by the user is an operation for commanding reproduction or a pause of audio data.

The power unit 18 supplies power (originates from an external power source) to the system controller 10. The system controller 10 supplies power to the individual sections on the basis of the power supplied from the power unit 18.

The audio output unit 19 outputs audio to a wired headphone or the like by an analog audio transmission.

Figure 2:
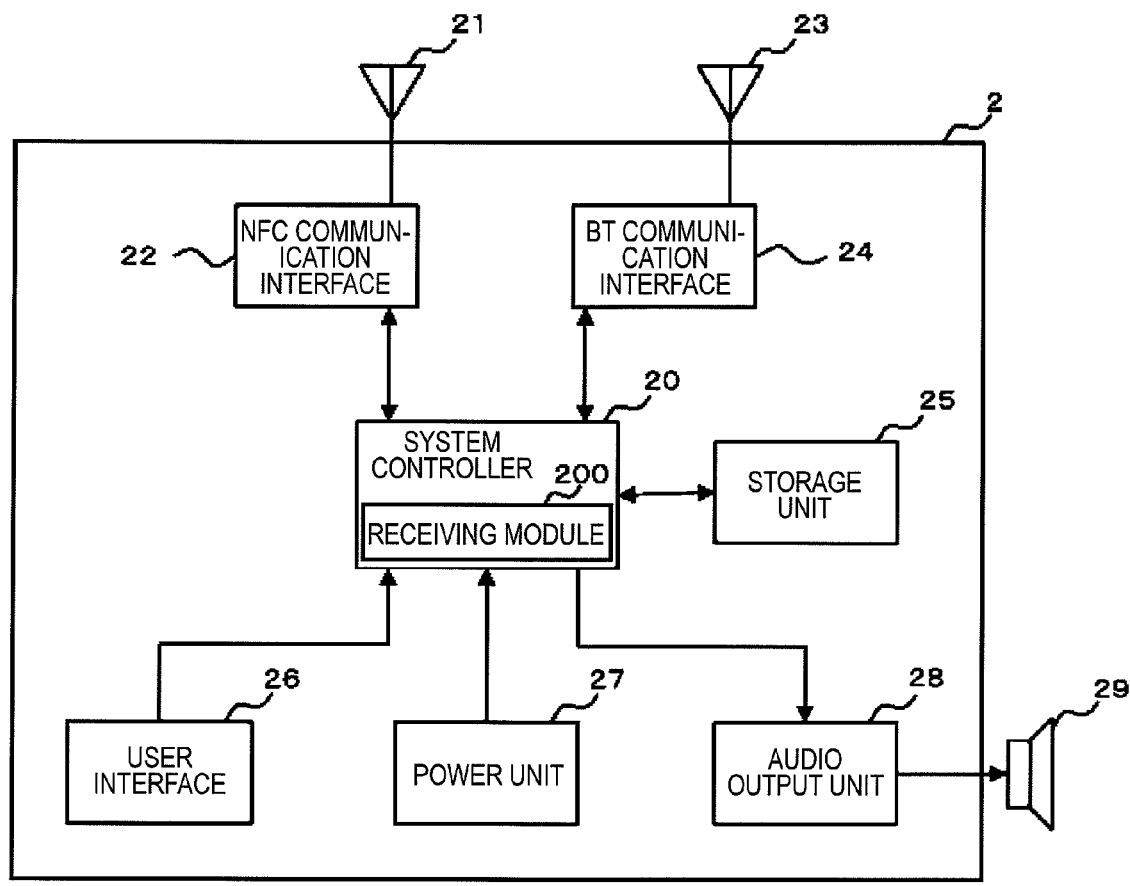
FIG. 2 is a functional block diagram of a speaker used in the first embodiment.

Next, a speaker 2 which is an example audio data reception side device will be described with reference to FIG. 2. FIG. 2 is a functional block diagram of the speaker 2 used in the first embodiment.

The speaker 2 is equipped with a system controller 20, an NFC antenna 21, an NFC communication interface 22, a BT communication antenna 23, a BT communication interface 24, a storage unit 25, a user interface 26, a power unit 27, an audio output unit 28, and a speaker unit 29.

The system controller 20, which is a processor for controlling the operations of the speaker 2, controls the individual sections by running programs that are stored in the storage unit 25.

The NFC antenna 21 is an antenna for an NFC communication with an external communication device.

The NFC communication interface 12 sends data to an external communication device by performing an NFC communication with its NFC communication interface via the NFC antenna 21.

The BT communication antenna 23 is an antenna for performing a BT communication with an external communication device.

The BT communication interface 24 receives data from an external communication device by performing a BT communication with its BT communication interface via the BT communication antenna 23.

The storage unit 25, which is a nonvolatile memory device, for example, stores programs for controlling the operations of the speaker 2. The programs include routines for causing the system controller 20 to perform a sink function which is a function of an audio data reception side device of A2DP of the BT as well as the functions of the NFC communication interface 22 and the BT communication interface 24. The sink function of A2DP is a function of an audio data reception side device of streaming reproduction of audio data such as musical data, and is used for reproducing an audio data stream in the form of a radio signal while receiving it. In this specification, it is assumed that a receiving section 200 performs the sink function of A2DP. The receiving section 200 is located inside the system controller 20 in FIG. 2 because it functions as programs for controlling related operations of the speaker 2 are run by the system controller 20. For example, the receiving section 200 decodes a received stream having an SBC format into PCM data.

The user interface 26 inputs an operation signal corresponding to an operation made by the user to the system controller 20. The operation made by the user may be either an operation made through a remote controller (not shown) or an operation made through a button or the like provided in the speaker 2. For example, the operation made by the user is an operation on the volume of audio that is output from the speaker unit 29.

The power unit 27 supplies power (originates from an external power source) to the system controller 20. The system controller 20 supplies power to the individual sections on the basis of the power supplied from the power unit 27.

The audio output unit 28 sends an audio data to the speaker unit 29 that is received by the receiving section 200 of the system controller 20.

The speaker unit 29 converts the audio data received from the audio output unit 28 into a sound and outputs it.

A specific description will be made of a BT communication which is performed between the audio player 1 and the speaker 2 each having the above-described functions to transmit audio data. First, the BT communication interface 14 of the audio player 1 recognizes a BD address that is unique to the BT communication interface 24 of the speaker 2 through an NFC communication and performs a BT communication with the speaker 2. In the embodiment, audio data is transmitted by streaming on a transport channel according to an AV (audio/video) profile of the BT communication from the audio player 1 having the A2DP source function. The speaker 2 having the A2DP sink function receives the transmitted audio data, which allows the user to enjoy music.

Next, a description will be made of the functions of the individual functional blocks that control an audio data transmission destination in the first embodiment. The individual functional blocks that control an audio data transmission destination perform their functions as the system controller 10 runs programs relating to the control of an audio data transmission destination which are stored in the storage unit 16. The functional blocks relating to the control of an audio data transmission destination include the identification information acquiring module 101, the determination module 102, and the audio data transmission destination control module 103.

The identification information acquiring module 101 acquires a BD address of the BT communication interface 24 via the NFC communication interface 22 of the speaker 2 which is a communication partner by an NFC communication performed by the NFC communication interface 12. Since a BD address is acquired through an NFC communication which is enabled by an action of bringing the audio player 1 close to the speaker 2, a communication partner of a BT communication can be designated directly and quickly.

The determination module 102 determines whether the BD address that has been acquired by the identification information acquiring module 101 match with a BD address of a destination communication device to which the transmitting module 100 is sending audio data by a BT communication.

If the determination module 102 determines that the BD address that has been acquired by the identification information acquiring module 101 match with the BD address of the destination communication device to which the transmitting module 100 is sending the audio data, the transmission destination control section 103 continues the transmission of the audio data. This is the case that the communication device to which the audio player 1 has been brought close to designate it as an audio data transmission destination is the same as the communication device to which the transmitting module 100 is sending the audio data. Since the audio data is already being sent to the communication device to be designated as an audio data transmission destination, it is not necessary to switch the audio data transmission destination.

On the other hand, if the determination module 102 determines that the acquired BD address does not coincide with the BD address of the destination communication device, first, the audio data transmission destination control module 103 causes the transmitting module 100 to stop the transmission of the audio data and disconnects the BT communication being performed by the BT communication interface 14. Then, the audio data transmission destination control module 103 establishes a BT communication with the communication device that is identified by the BD address that was acquired by the identification information acquiring module 101 and causes the transmitting module 100 to start sending audio data to it. That is, the audio data transmission destination control module 103 switches the audio data transmission destination to send the audio data to the speaker 2 which is the communication device that is close to the audio player 1 and to cause the speaker 2 to reproduce audio.

Next, a description will be made of how audio data is processed when the transmitting module 100 having the source function switches the audio data transmission destination. The transmitting module 100 can perform a streaming transmission of encoded audio data only while an A2DP wireless link is established by the BT communication interface 14. The streaming transmission means sending audio data to a reception device in order of its reproduction. When a BT communication being performed by the BT communication interface 14 is disconnected by the audio data transmission destination control module 103, a position in the audio data that corresponds to a time point of the disconnection is stored. When a link is established again, the transmitting module 100 restarts streaming transmission of the audio data from the position stored therein. Therefore, even if the audio data transmission destination is switched, the transmission of the audio data is performed continuously and no overlap or loss occurs between the audio data that are output from the two communication devices.

Figure 3:
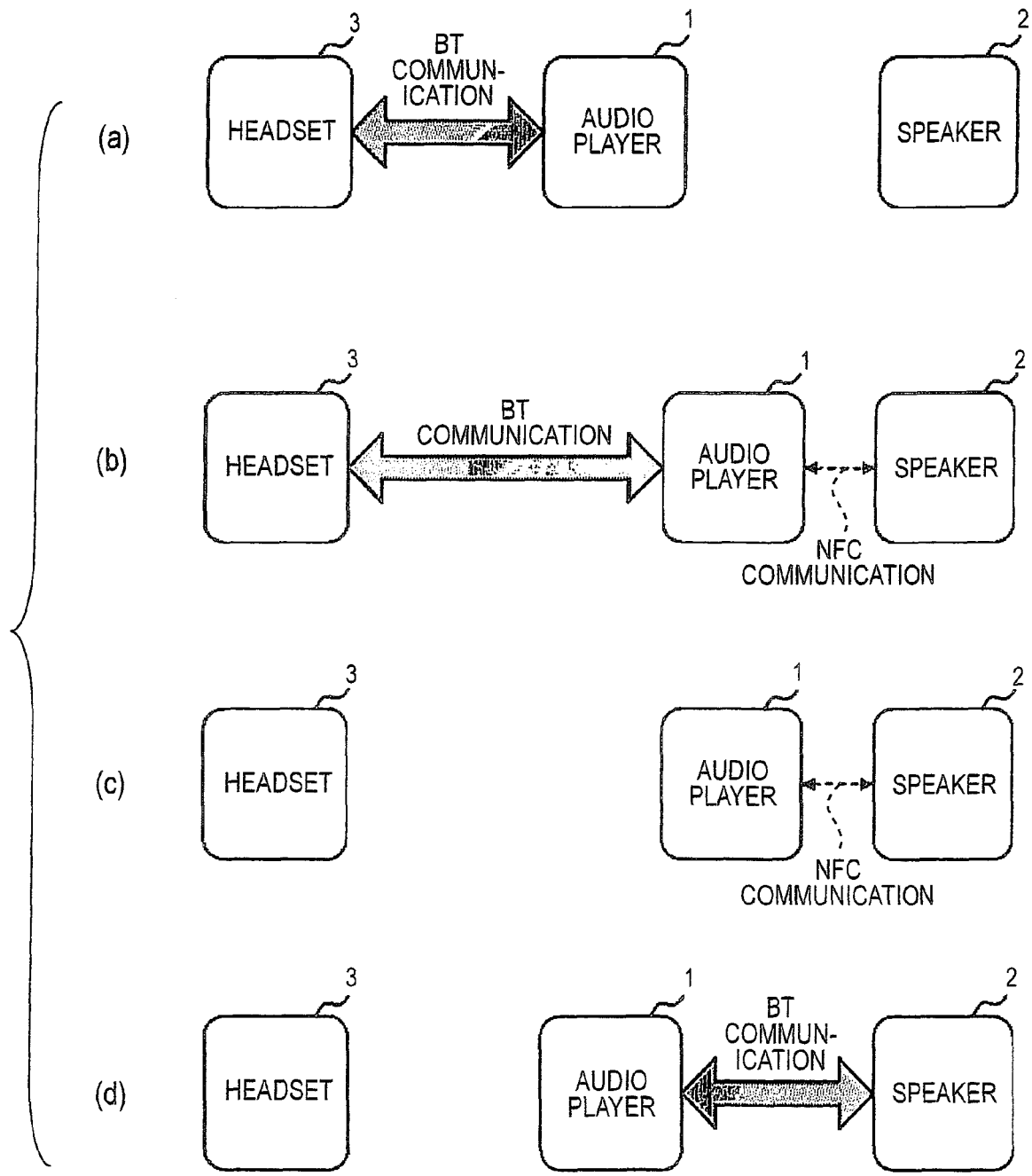
FIG. 3 shows examples of control of an audio data transmission destination according to the first embodiment.

Next, a procedure of control of an audio data transmission destination according to the first embodiment which is performed by the functions of the above-described functional blocks will be described in order with reference to sections (a)-(d) shown in FIG. 3. The sections (a)-(d) shown in FIG. 3 show an example control of an audio data transmission destination according to the first embodiment. A description will be made of a case that the communication device that sends audio data is the audio player 1 and the communication devices that receive and reproduce the transmitted audio data are the speaker 2 and a headset 3.

The headset 3 is different in shape from the speaker 2 but has the same basic configuration as the speaker 2 (see FIG. 2). That is, like the speaker 2, the headset 3 has the function of receiving audio data from the audio player 1 by a BT communication and reproducing it.

The section (a) of FIG. 3 shows a state that a BT communication is established between the audio player 1 and the headset 3 and the headset 3 is reproducing audio data.

The section (b) of FIG. 3 shows a state that the audio player 1 is brought close to the speaker 2. As a result, the NFC communication interface 12 of the audio player 1 and the NFC communication interface 22 of the speaker 2 establish an NFC communication. The identification information acquiring module 101 acquires a BD address of the BT communication interface 24 via the NFC communication interface 22 of the speaker 2 by an NFC communication. The determination module 102 determines whether the BD address of the speaker 2 that has been acquired by the identification information acquiring module 101 match with a BD address of the headset 3 which is the current audio data transmission destination.

The section (c) of FIG. 3 shows a state that the BT communication with the headset 3 has been disconnected and the transmission of the audio data is suspended. In the state shown as section (b) of FIG. 3, the determination module 102 determines that the BD address of the speaker 2 that has been acquired by the identification information acquiring module 101 does not coincide with the BD address of the headset 3 to which the audio data is being transmitted. As a result, the audio data transmission destination control module 103 controls the transmitting module 100 so that it stops the transmission of the audio data to the headset 3 and controls the BT communication interface 14 so that it disconnects the BT communication with the headset 3. The transmitting module 100 stores a position in the audio data that corresponding to a time point of the disconnection of the BT communication.

The section (d) of FIG. 3 shows a state that a BT communication with the speaker 2 has been established on the basis of the BD address of the speaker 2 that was acquired by the identification information acquiring module 101 in the state shown by section (b) of FIG. 3 and audio data transmission to the speaker 2 has been started. That is, the audio data transmission destination control module 103 establishes a BT communication with the speaker 2 and restarts the audio data transmission from the position stored in the transmitting module 100.

The process according to the first embodiment of switching the audio data transmission destination to the speaker 2 which is the communication device that is brought close to the audio player 1 is thus completed.

Figure 4:
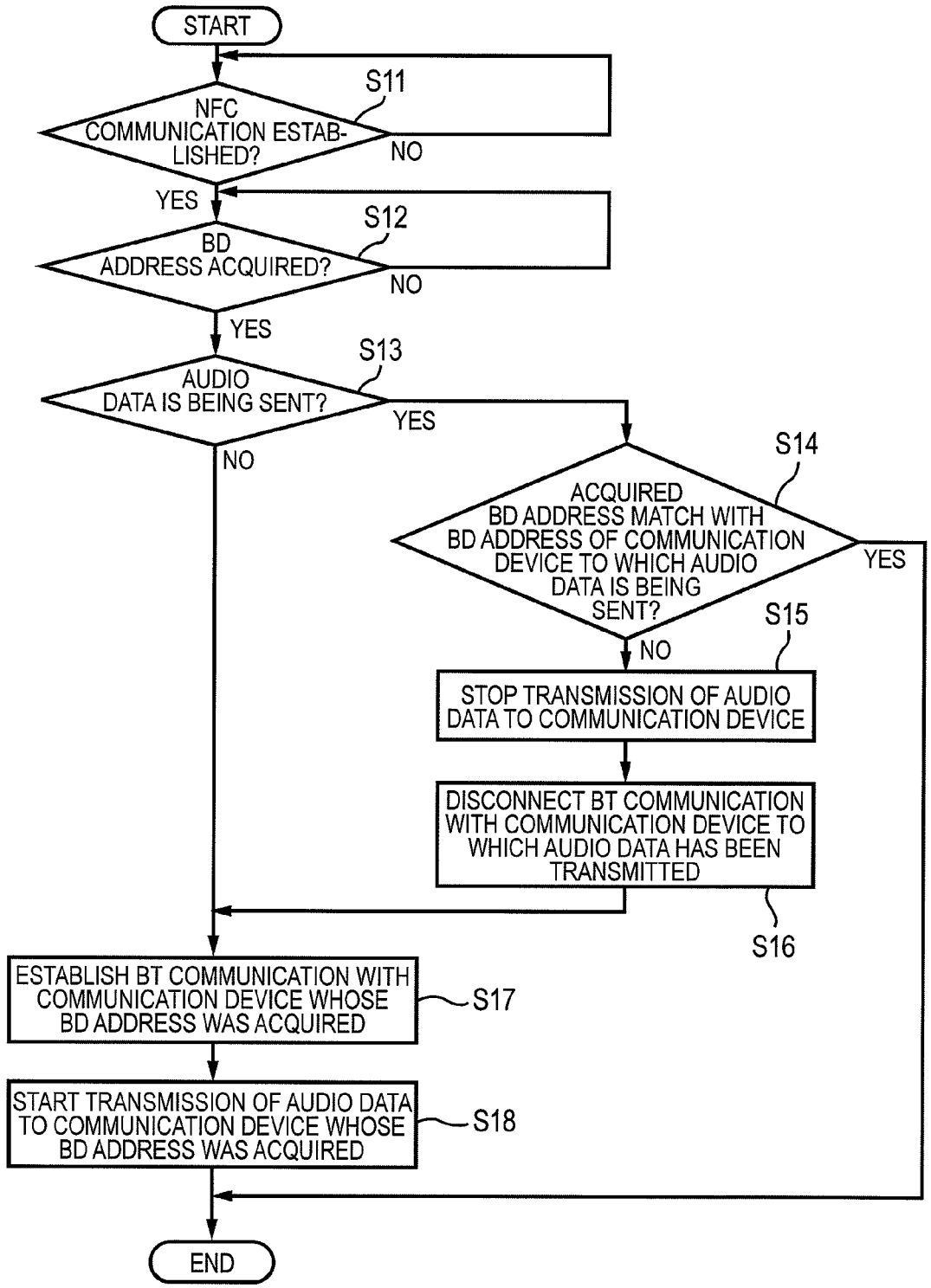
FIG. 4 is a flowchart of the procedure of control of an audio data transmission destination according to the first embodiment.

Next, the procedure of control of an audio data transmission destination according to the first embodiment will be described with reference to FIG. 4. FIG. 4 is a flowchart of the procedure of control of an audio data transmission destination according to the first embodiment. The procedure of FIG. 4 is followed as the system controller 10 runs a program relating to the control of an audio data transmission destination.

First, at step S11, the system controller 10 determines whether an NFC communication with a communication device to which the audio player 1 has been brought close has been established by the NFC communication interface 12. The processing that is performed until establishment of an NFC communication will not be described here because it is a known technique.

If the system controller 10 determines that an NFC communication has not been established yet (S11: no), the following steps will not be executed until the system controller 10 determines that an NFC communication has been established. On the other hand, if the system controller 10 determines that an NFC communication has been established (S11: yes), the system controller 10 determines at step S12 whether the identification information acquiring module 101 has acquired a BD address of the partner communication device.

If the system controller 10 determines that a BD address has not been acquired yet (S12: no), the following steps will not be executed until the system controller 10 determines that a BD address has been acquired. On the other hand, if the system controller 10 determines that a BD address has been acquired (S12: yes), the system controller 10 determines at step S13 whether the transmitting module 100 is sending audio data to another communication device.

If the system controller 10 determines that the transmitting module 100 is not sending audio data to another communication device (S13: no), the process moves to step S17 (described later). On the other hand, if the system controller 10 determines that the transmitting module 100 is sending audio data to another communication device (S13: yes), the determination module 102 determines at step S14 whether the BD address that was acquired by the identification information acquiring module 101 is the same as a BD address of the communication device to which the transmitting module 100 is sending the audio data. Step S14 corresponds to the state of FIG. 3(*b*).

If the determination module 102 determines that the BD address that was acquired by the identification information acquiring module 101 is the same as the BD address of the communication device to which the transmitting module 100 is sending the audio data (S14: yes), the process is finished. That is, this is the case that the audio data is being transmitted to the communication device to which the audio player 1 is brought close and the communication device is reproducing audio. Therefore, the reproduction of the audio data by this communication device is continued. On the other hand, if the determination module 102 determines that the BD address that was acquired by the identification information acquiring module 101 is not the same as the BD address of the communication device to which the transmitting module 100 is sending the audio data (S14: no), at step S15 the audio data transmission destination control module 103 controls the transmitting module 100 so that it stops the transmission of the audio data to the communication device. That is, if the audio data is not being sent to the communication device to which the audio player 1 is brought close, first the current transmission of the audio data to the communication device is stopped.

At step S16, the audio data transmission destination control module 103 disconnects the BT communication with the audio data transmission destination communication device that has been performed by the BT communication interface 14. Steps S15 and S16 correspond to the state of section (c) of FIG. 3. The transmitting module 100 stores a position in the audio data that corresponds to a time point of the disconnection of the BT communication.

At step S17, the audio data transmission destination control module 103 controls the BT communication interface so that it establishes a BT communication with the communication device that is identified by the BD address that was acquired by the identification information acquiring module 101. At step S18, the audio data transmission destination control module 103 controls the transmitting module 100 so that it starts sending, from the stored position, the audio data to the communication device with which the BT communication has been established. Steps S17 and S18 correspond to the state of section (d) of FIG. 3. The process of switching the audio data transmission destination to the communication device to which the audio player 1 is brought close is thus completed.

As described above, the first embodiment makes it possible to establish a BT communication with a communication device to which the player is brought close and to switch the audio data transmission destination by using an NFC communication. That is, the first embodiment realizes an intuitive operation of designating a BT device to output audio by bringing the player close to it. Conventionally, a communication partner with which to establish a BT communication is designated in such a manner that a data transmission side BT device inquires of BT devices whether they can communicate by sending IQ packets to them. However, the inquiring operation takes time and the user is required to select a communication device from a list of communication devices that responded to the inquiry. In contrast, the embodiment can shorten the time taken to establish a BT communication because designation of a communication device is completed merely by bringing the player to it. Furthermore, ongoing data transmission is not affected at all because a BT communication is established without sending IQ packets and receiving any response packets to them.

Next, a second embodiment will be described. First, functions of individual functional blocks which perform control of an audio data transmission destination according to the second embodiment. The functions of the individual functional blocks which perform control of an audio data transmission destination are performed as the system controller 10 runs a program relating to control of a transmission destination of audio data that is stored in the storage unit 16. The functional blocks relating to the control of an audio data transmission destination include the identification information acquiring module 101, the determination module 102, and the audio data transmission destination control module 103 which are located in the system controller 10 in FIG. 1. The function of the identification information acquiring module 101 is the same as in the first embodiment and hence will not be described here.

First, the determination module 102 according to the second embodiment determines whether a BD address that was acquired by the identification information acquiring module 101 match with a BD address of a communication device to which audio data is being sent. If the determination module 102 determines that the BD address that was acquired by the identification information acquiring module 101 does not coincide with the BD address of the communication device to which the audio data is being sent, the determination module 102 determines whether it is possible to add a new audio data transmission destination. This is because there may occur a case that an audio data transmission destination communication device cannot be added due to the upper limit of the data transfer rate of BT communication. For example, where a streaming transmission is performed according to an A2DP profile with an SBC used as an audio codec, a data transfer rate of about 350 kbps is required per device. This sets an upper limit for the number of audio data transmission destination communication devices.

If the determination module 102 determines that it is possible to add a new audio data transmission destination, the audio data is also sent to that communication device. If the determination module 102 determines that it is impossible to add a new audio data transmission destination, priority ranks of audio data transmission destinations stored in the storage unit 16 and a communication device having a lowest priority rank is determined. The priority order is used for determining a communication device the audio data transmission to which should be stopped when it is impossible to add a new audio data transmission destination communication device. The method for setting priority order will be described later. That is, to send the audio data to a communication device with which the user wants to reproduce audio newly, the audio data transmission to one of the communication devices that are outputting audio currently is stopped.

Then, the audio data transmission destination control module 103 stops the audio data transmission to the communication device whose priority rank has been determined lowest by the determination module 102. Furthermore, the audio data transmission destination control module 103 disconnects the BT communication that has been performed by the BT communication interface 14. Then, the audio data transmission destination control module 103 establishes a BT communication between the BT communication interface 14 and the communication device that is identified by the BD address that was acquired by the identification information acquiring module 101, and causes the transmitting module 100 to send the audio data to it.

Figure 5:
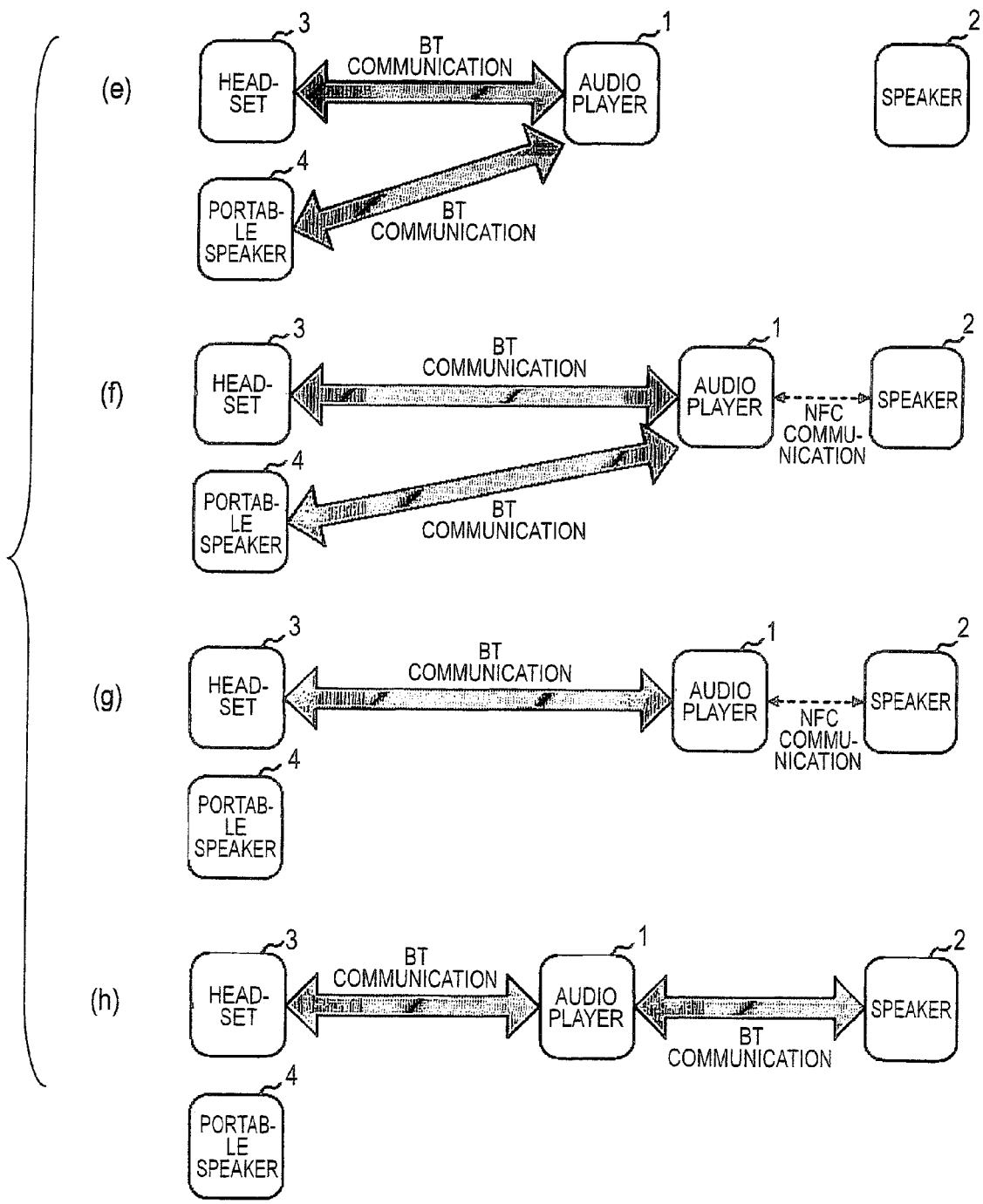
FIG. 5 shows a flow of control of an audio data transmission destination according to a second embodiment.

Next, a procedure of control of an audio data transmission destination according to the second embodiment will be described in order with reference to sections (e)-(h) shown in FIG. 5. The sections (e)-(h) of FIG. 5 show a flow of control of an audio data transmission destination according to the second embodiment. This control procedure is different than in the first embodiment in that as shown in section (e) of FIG. 5 the audio player 1 is sending audio data to plural communication devices. More specifically, the audio player 1 has established BT communications with two communication devices that are the headset 3 and a portable speaker 4 and the two communication devices are reproducing audio data.

Like the headset 3, the portable speaker 4 is different in shape from the speaker 2 but has the same basic configuration as the speaker 2 (see FIG. 2).

That is, the headset 3 and the portable speaker 4 are the same as the speaker 2 in the function of receiving audio data from the audio player 1 by a BT communication and reproducing it.

In the example of section (e)-(h) shown in FIG. 5, it is assumed that the headset 3 has a higher priority rank than the portable speaker 4. The section (f) of FIG. 5 shows a state that the audio player 1 is brought close to the speaker 2. The NFC communication interface 12 of the audio player 1 and the NFC communication interface 22 of the speaker 2 establish an NFC communication. The identification information acquiring module 101 of the system controller 10 acquires a BD address from the NFC communication interface 22. Then, the determination module 102 determines whether the BD address of the speaker 2 that has been acquired by the identification information acquiring module 101 match with BD addresses of the headset 3 and the portable speaker 4 that are the current audio data transmission destinations.

The section (g) of FIG. 5 shows a state that the audio data transmission to the portable speaker 4 is stopped and the BT communication with it is disconnected. In the state shown in section (f) of FIG. 5, the determination module determines that the BD address of the speaker 2 that has been acquired by the identification information acquiring module 101 match with neither of the BD addresses of the headset 3 nor the portable speaker 4 that are the current audio data transmission destinations. Then, the determination module 102 determines whether it is possible to add a new audio data transmission destination. If determining that it is impossible to add a new audio data transmission destination, the determination module 102 determines a communication device whose priority rank is lowest. As a result, the audio data transmission destination control module 103 controls the transmitting module 100 so that it stops the audio data transmission to the portable speaker 4, and controls the BT communication interface 14 so that it disconnects the BT communication concerned. The transmitting module 100 stores a position in the audio data that corresponds to a time point of the disconnection of the BT communication.

The section (h) of FIG. 5 shows a state that a BT communication with the speaker 2 has been established on the basis of the BD address of the speaker 2 that was acquired by the identification information acquiring module 101 in the state of section (b) of FIG. 3 and audio data transmission the speaker 2 has been started. That is, the audio data transmission destination control module 103 establishes a BT communication with the speaker 2 and causes the transmitting module 100 to restart sending the audio data from the position stored therein.

A manner of setting of priority order will be described with reference to FIGS. 6 and 7. FIG. 6 shows an example priority order setting picture used in the second embodiment. The audio player 1 causes the user to set priority order by displaying a setting picture as shown in FIG. 6 on the display unit 15 to the user and receiving operation signals from the operation input section 17. In FIG. 6, the user sets priority ranks at the positions indicated by the underlines using a remote controller, for example. The priority ranks that are input through the operation input section 17 are stored in the storage unit 16.

Next, a case of setting priority order according to the numbers of times of connection to an audio data transmission side device will be described with reference to FIG. 7. FIG. 7 is a conceptual diagram showing an example information management according to the second embodiment in which priority order of audio data transmission destinations is set according to the numbers of communications performed with the respective transmission destinations. The audio data transmission destination control module 103 stores the numbers of times the BT communication interface 14 has performed a BT communication with other communication devices, respectively, in the storage unit 16. For example, the audio data transmission destination control module 103 manages the priority order in such a manner that as shown in FIG. 7 BD addresses of respective communication devices are correlated with the numbers of times of connection to the audio player 1. Priority ranks are set in descending order of the number of times of connection. As a result, a BT device that has been selected by the user a smallest number of times as a BT device to reproduce audio will be made a subject of stopping of audio output. Preferentially allowing BT devices that have been selected by the user as audio output communication devices larger number of times to reproduce audio makes it possible to realize an acoustic environment that conforms to the tastes of the user.

Next, a case of setting priority order according to accumulated times of communications performed with the audio data transmission side device will be described with reference to FIG. 8. FIG. 8 is a conceptual diagram showing an example information management according to the second embodiment in which priority order of audio data transmission destinations is set according to accumulated times of communications performed with the respective transmission destinations. The audio data transmission destination control module 103 stores accumulated times of communications performed by the BT communication interface 14 with other communication devices, respectively, in the storage unit 16. For example, the audio data transmission destination control module 103 manages the priority order in such a manner that as shown in FIG. 8 BD addresses of respective communication devices are correlated with accumulated times of communications performed with the audio player 1. Priority ranks are set in descending order of the accumulated communication time. As a result, a BT device that has been used by the user as a BT device to reproduce audio in a smallest accumulated communication time will be made a subject of stopping of audio output. Preferentially allowing BT devices that have been used by the user as audio reproduction communication devices for longer times in total makes it possible to reproduce audio with BT devices the user has preferred so far as devices to reproduce audio.

Figure 9:
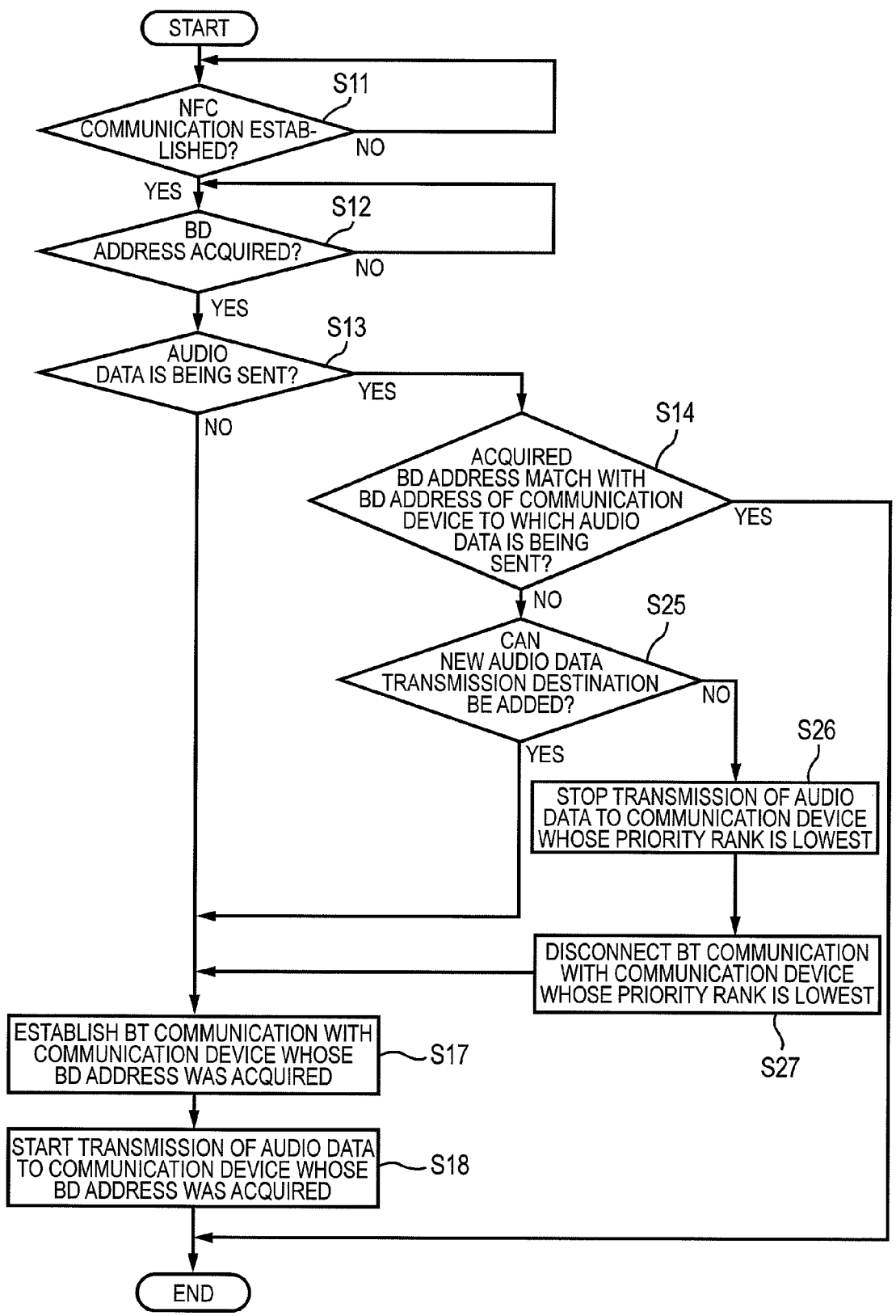
FIG. 9 is a flowchart of a procedure of control of an audio data transmission destination according to the second embodiment.

Next, the procedure of control of an audio data transmission destination according to the second embodiment will be described with reference to FIG. 9. FIG. 9 is a flowchart of the procedure of control of an audio data transmission destination according to the second embodiment. The procedure of FIG. 9 is followed as the system controller 10 runs a program relating to the control of an audio data transmission destination. The same steps as in the flowchart of FIG. 4 which shows the procedure of control of an audio data transmission destination according to the first embodiment are given the same reference symbols as in FIG. 4 and will not be described.

If the determination module 102 determines that a BD address that was acquired by the identification information acquiring module 101 is not the same as a BD address of any communication device to which audio data is being sent (S14: no), at step S25 the determination module 102 determines whether a new audio data transmission destination can be added.

If the determination module 102 determines that a new audio data transmission destination can be added (S25: yes), the process moves to step S17. On the other hand, if the determination module 102 determines that a new audio data transmission destination cannot be added (S25: no), at step S26 the determination module 102 determines a communication device whose priority rank is lowest. And the audio data transmission destination control module 103 controls the transmitting module 100 so that it stops the transmission of the audio data to the communication device whose priority rank is lowest.

At step S27, the audio data transmission destination control module 103 performs a control so that the BT communication with the communication device whose priority rank is lowest that has been performed by the BT communication interface 14 is disconnected. Since the process then moves to step S17, the subsequent steps will not be described.

As described above, the second embodiment makes it possible to send audio data to an additional communication device to which the player is brought close even in the case where the audio player 1 is sending the audio data to plural communication devices. The use of an NFC communication makes it possible to omit an inquiry operation and an operation of designating a communication device from a list and hence to shorten the time taken to designate a communication partner. Furthermore, as in the first embodiment, ongoing data transmission is not affected at all because a BT device is designated without sending IQ packets and receiving any response packets to them.

Furthermore, in the second embodiment, setting priority order for communication devices makes it possible to send audio data to proper communication devices when the number of audio data transmission destinations has reached the upper limit. For example, where priority ranks are set in descending order of the number of times of connection to the audio player 1, audio is output preferentially from BT devices the user designates frequently as audio output devices. Where priority ranks are set in descending order of the accumulated time of communications with the audio player 1, audio is output preferentially from BT devices the user has used for long times in total to output audio. As a further alternative, audio output BT devices may be set preferentially according the tastes of the user.

Although the embodiments are directed to the case that the communication subject data is audio data, the invention is not limited to such a case. That is, the communication subject data may be any data such as image data, text data, or binary data. Where various kinds of data are employed as communication subject data, a personal computer or a video player can be used as a data transmission side device and a TV receiver, a projector, etc. can be used as data reception side devices.

Although the embodiment according to the present invention has been described above, the present invention is not limited to the above-mentioned embodiment but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication device comprising:
   a first communication interface configured to transmit audio data to a first counterpart device via a first wireless communication according to a first communication method using identification information of the first counterpart device, the audio data being sent to be output from the first counterpart device;
   a second communication interface configured to execute a second wireless communication with a second counterpart device according to a second communication method in which the second wireless communication is established if the second counterpart device is within a predetermined distance;
an identification information receiver configured to receive identification information unique to the second counterpart device from the second counterpart device by the second wireless communication; and
a communication controller configured to stop the first wireless communication and to start the second wireless communication when the identification information receiver receives the identification information unique to the second counterpart device while the first communication interface is performing the first wireless communication with the first counterpart device, to thereby switch transmitting the audio data from the first counterpart device to the second counterpart device.

2. The device of claim 1 further comprising a priority setting module configured to set priority ranks of communication devices as audio data transmission destinations,
wherein the communication controller is configured to disconnect the first wireless communication with a counterpart device whose priority rank is set substantially low by the setting module when the first communication interface is transmitting the audio data to a plurality of counterpart devices.

3. The device of claim 2, wherein the communication controller is configured to determine whether the first communication interface is able to transmit audio data to the second counterpart device, and to stop the audio data transmission to a communication device whose priority rank is set substantially low by the setting module when determined that the first communication interface is unable to transmit audio data to the second counterpart device when determined that the identification information of the second counterpart device is different from the identification information of any of the plural other communication devices.

4. The device of claim 3, wherein the setting module is configured to assign a substantially low priority rank to a counterpart device comprising a substantially small number of first wireless communications with the first communication interface.

5. The device of claim 3, wherein the setting module is configured to assign substantially low priority rank to a communication device comprising a substantially short accumulated time of first wireless communications with the first communication interface.

6. The device of claim 1, wherein the first communication interface is configured to transmit a sequence of audio data in order of reproduction, and
wherein the communication controller is configured to transmit a portion of the sequence of audio data after a position corresponding to a time point of the stop of transmission of the audio data sequence, in order, to the second counterpart device.

7. A communication device comprising:
a first communication interface configured to transmit audio data to a first counterpart device by a first wireless communication according to a first communication method using identification information of the communication device and the first counterpart device, the audio data being sent to be output from the first counterpart device;
a second communication interface configured to execute a second wireless communication with a second counterpart device according to a second communication method comprising a second communication distance shorter than a first communication distance of the first communication method when the second counterpart device is within the second communication distance of the second communication method;
an identification information receiver configured to receive identification information unique to the second counterpart device from the second counterpart device by the second wireless communication; and
a communication controller configured to stop the first wireless communication and to start the second wireless communication when the identification information receiver receives the identification information unique to the second counterpart device while the first communication interface is performing the first wireless communication with the first counterpart device, to thereby switch transmitting the audio data from the first counterpart device to the second counterpart device.

8. The device of claim 1, wherein the first communication interface is configured to transmit to the second counterpart device the audio data starting from a position in the audio data that corresponds to a time point when the controller stops the first wireless communication with the first counterpart device.

9. The device of claim 1, wherein the first communication interface is configured to transmit to the second counterpart device the audio data starting from a position in the audio data that corresponds to a time point when an audio output of the first counterpart device is stopped.

10. The device of claim 7, wherein the first communication interface is configured to transmit to the second counterpart device the audio data starting from a position in the audio data that corresponds to a time point when the controller stops the first wireless communication with the first counterpart device.

11. The device of claim 7, wherein the first communication interface is configured to transmit to the second counterpart device the audio data starting from a position in the audio data that corresponds to a time point when an audio output of the first counterpart device is stopped.

* * * * *